(12) United States Patent
Hirano

(10) Patent No.: US 6,460,642 B1
(45) Date of Patent: *Oct. 8, 2002

(54) HIGH POWER CABLE ALIGNING DEVICE FOR ELECTRIC VEHICLE

(75) Inventor: Hiroyuki Hirano, Kanagawa (JP)

(73) Assignee: Nissan Motor Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/432,771

(22) Filed: Nov. 3, 1999

(30) Foreign Application Priority Data

Nov. 11, 1998 (JP) .......................................... 10-320158

(51) Int. Cl.[7] ................................................ B60K 1/00
(52) U.S. Cl. ...................................... 180/65.1; 180/271
(58) Field of Search ............................... 180/65.2, 65.3, 180/65.4, 65.6, 65.7, 65.1, 271; 248/226.12; 439/289, 954

(56) References Cited

U.S. PATENT DOCUMENTS

| | | | | |
|---|---|---|---|---|
| 3,645,353 A | * | 2/1972 | Cope et al. ..................... 180/90 |
| 3,799,284 A | * | 3/1974 | Hender ...................... 180/65 A |
| 3,828,880 A | * | 8/1974 | Smith ........................ 180/66 R |
| 4,042,056 A | * | 8/1977 | Horwinski ................ 180/65 A |
| 4,758,791 A | * | 7/1988 | Tedeschi ...................... 324/402 |
| 4,771,743 A | * | 9/1988 | McDowell .............. 123/143 C |
| 5,144,100 A | * | 9/1992 | Andel .......................... 174/135 |
| 5,179,919 A | * | 1/1993 | Foltz ...................... 123/143 C |
| 5,355,581 A | * | 10/1994 | Soriano ........................ 29/857 |
| 5,416,595 A | * | 5/1995 | Wield .......................... 348/825 |
| 5,676,338 A | * | 10/1997 | Warda et al. ............... 248/27.1 |
| 5,689,174 A | * | 11/1997 | Pacheco, Sr. ................. 322/16 |
| 5,842,534 A | * | 12/1998 | Frank ........................ 180/65.2 |

OTHER PUBLICATIONS

Tetsudo Nihon Sha, "Automobile Engineering," vol. 46, No. 7, p. 39–52, Jun. 1997.*

* cited by examiner

Primary Examiner—Brian L. Johnson
Assistant Examiner—Christopher Bottorff
(74) Attorney, Agent, or Firm—Foley & Lardner

(57) ABSTRACT

A high power cable (53A, 53B) connects an electric terminal (51A, 51B) of a transaxle case (45) housing an electric motor (4) coupled to a drive shaft S and an electric terminal (52A, 52B) of an inverter housing (40) which supplies power to the electric motor (4) in a hybrid drive vehicle. A holder (54A, 54B) is provided which holds the high power cable (53A, 53B) in a curved shape in the axial direction of the drive shaft. The holder (54A, 54B) releases the high power cable (53A, 53B) when a predetermined external force acts on the high power cable (53A, 53B) toward the front of the vehicle.

8 Claims, 6 Drawing Sheets

HIGH POWER CABLE ALIGNING DEVICE FOR ELECTRIC VEHICLE

FIELD OF THE INVENTION

This invention relates to an arrangement of a high power cable which connects a motor and power supply devices of hybrid drive vehicles and electric drive vehicles.

BACKGROUND OF THE INVENTION

A parallel hybrid vehicle which runs under the power of either the engine or the motor, or both, is disclosed in pp. 39–52 of "Automobile Engineering", Vol. 46, No.7, published in June 1997 in Japan by Tetsudo Nihon Sha.

In such a hybrid vehicle, the engine and the motor are supported on the vehicle body via a relatively low rigidity mount which uses a large mass of rubber or the like to suppress transmission of vibration to the vehicle body. On the other hand, an electric power supply device is installed via a relatively high rigidity bracket on the body. Therefore, some relative movement arises between the motor and electric power supply device while the vehicle is traveling.

To absorb this relative motion, there must be some tolerance in the length of high power cable which supplies power from the electric power supply device to the motor. If the vehicle were to suffer an impact which did not damage the motor, but which caused a larger relative displacement than usual, it is desirable that this displacement would not damage the cable so that the vehicle could continue to run. The high power cable is therefore designed to have a length which can comply with such a necessity.

SUMMARY OF THE INVENTION

In a hybrid vehicle, in addition to an engine, a motor for running, a motor for generating power, a motor for generating oil pressure, a high output battery for driving motors, a battery for driving auxiliary devices and inverters for controlling the output of the motors, are installed in an engine room.

As a result, there is little space available surrounding the engine and motors, and it is difficult to provide a high power cable of sufficient length. Also, if the length of the high power cable is increased, it easily comes in contact with other instruments due to vibration when the vehicle is running, so there is a high probability that the cable will be damaged and wear out due to this contact.

Even in an electric drive vehicle having only a motor as source of drive force, a reaction to the motor drive force causes relative motion between the motor and power supply devices, and there is a risk that the same problem will occur as with a hybrid drive vehicle.

It is therefore an object of this invention to suitably arrange a high power cable which connects a motor with a power supply device in a hybrid drive vehicle or electric drive vehicle.

In order to achieve the above object, this invention provides an aligning device for a high power cable in such an electric drive vehicle that comprises a drive device including an electric motor coupled to a drive shaft, and a power supply device which supplies current to the electric motor via a high power cable. The aligning device comprises a holder that holds the high power cable in a curved shape in an axial direction of the drive shaft while releasing the high power cable when the high power cable is subject to a predetermined external force acting toward the front of the vehicle.

The details as well as other features and advantages of this invention are set forth in the remainder of the specification and are shown in the accompanying drawings.

DESCRIPTION OF THE PREFERRED EMBODIMENTS

Figure 1:
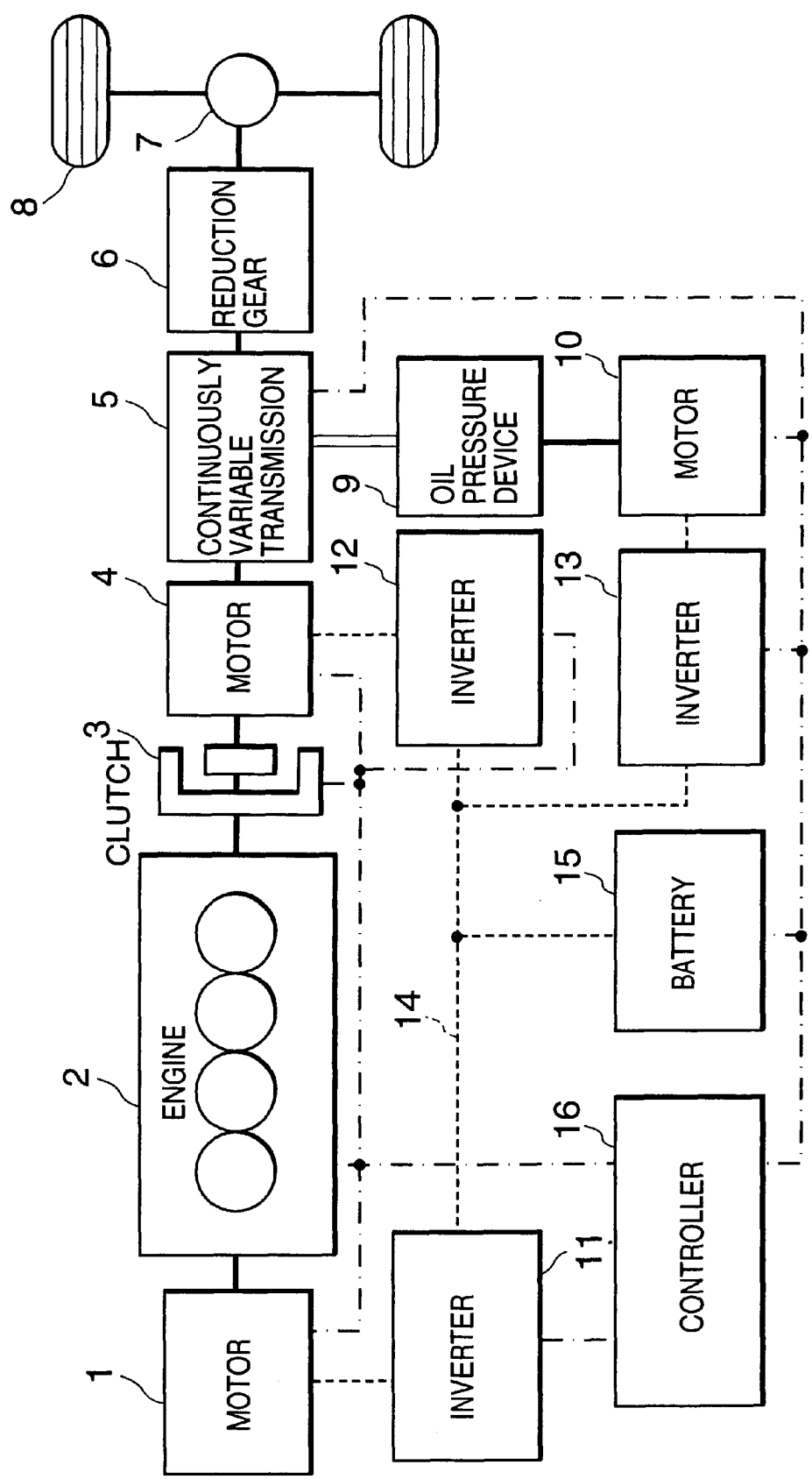
FIG. 1 is a schematic diagram of a hybrid drive vehicle to which this invention is applied.

Referring to FIG. 1 of the drawings, a parallel hybrid drive vehicle to which this invention is applied comprises an engine 2 connected to a motor 4 via a clutch 3. When the clutch 3 is released, only the output torque of the motor 4 is transmitted to drive wheels 8 via a continuously variable transmission 5, reduction device 6 and differential gear 7.

When the clutch 3 is engaged, the output torques of both the engine 2 and motor 4 are transmitted to the drive wheels 8. The continuously variable transmission may be a V-belt continuously variable transmission, toroidal continuously variable transmission or the like, and its speed ratio is varied continuously according to an oil pressure supplied by an oil pressure device 9.

Other motors 1 and 10 are also connected to the engine 2. The motor 1 is mainly used to start the engine 2 and to generate electric power. The motor 4 is mainly used to drive the drive wheels 8 and for generating regenerative power using the braking of the vehicle.

Therefore, the motors 1 and 4 are motor/generators.

On the other hand, the motor 10 is used to drive an oil pump with which the oil pressure device 9 is provided, and it functions only as a motor.

The motors 1, 4 and 10 are alternating current motors. The operation of the motors 1, 4 and 10 is respectively controlled via inverters 11, 12 and 13.

The solid line of FIG. 1 shows the transmission path of mechanical force, the broken line shows the transmission path of power, the dot-and-dash line shows the transmission path of signals, and the double line shows the transmission path of oil pressure.

This invention is applied to a high power cable forming a power transmission path between the motor 1, 4, 10, and the inverters 11, 12, 13.

Figure 2:
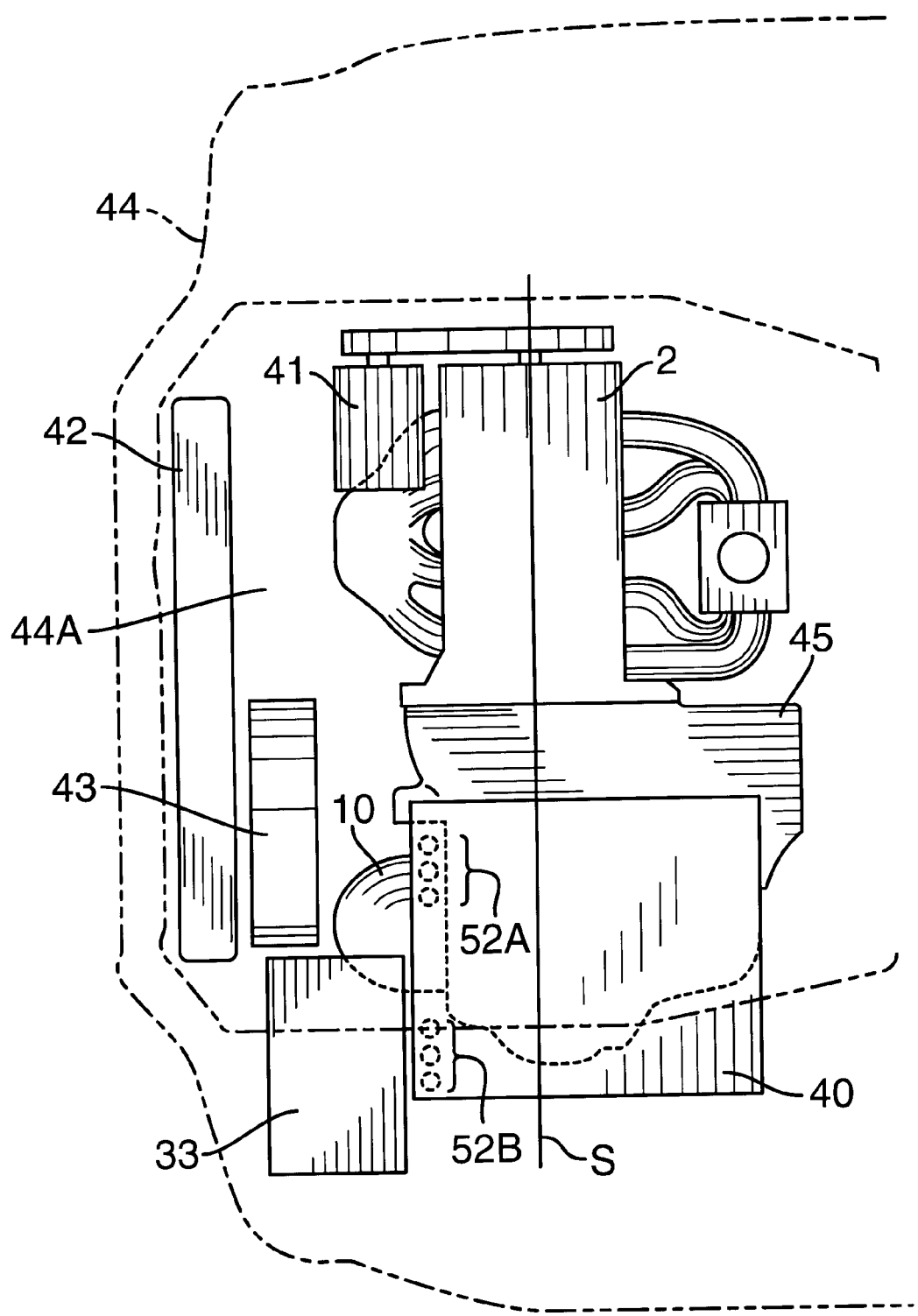
FIG. 2 is a plan view of an engine room in the hybrid drive vehicle.

Next, referring to FIG. 2, an engine room 44A is formed in a vehicle body 44 which is a monocoque body.

An engine 2 is arranged in the engine room 44A such that the rotation shaft of the engine 2 is perpendicular to the direction of travel of the vehicle. In addition, the motor 10, auxiliary battery 33, inverter housing 40, air conditioner compressor 41, radiator 42, electric fan 43, and transaxle case 45 are disposed in the engine room 44A.

The transaxle case 45 is joined to one edge of the engine 2, and comprises a drive device of the vehicle together with the engine 2. The motor 1, clutch 3, motor 4, continuously variable transmission 5 and reduction device 6 shown on FIG. 1 are built into the transaxle case 45. The engine 2 and motor 4 are arranged coaxially via the clutch 3. In the following description, the shaft of the motor 4 is referred to as a drive shaft S. The engine 2 and transaxle case 45 are supported in the vehicle body 44 via a low rigidity support mechanism, not shown, by a rubber mount.

The inverter housing 40 corresponds to an electric power supply device of the vehicle and accommodates the inverters 11–13 shown in FIG. 1. The inverter housing 40 is supported in the body 44 above the transaxle case 45 via a high rigidity support mechanism, not shown.

Figure 3:
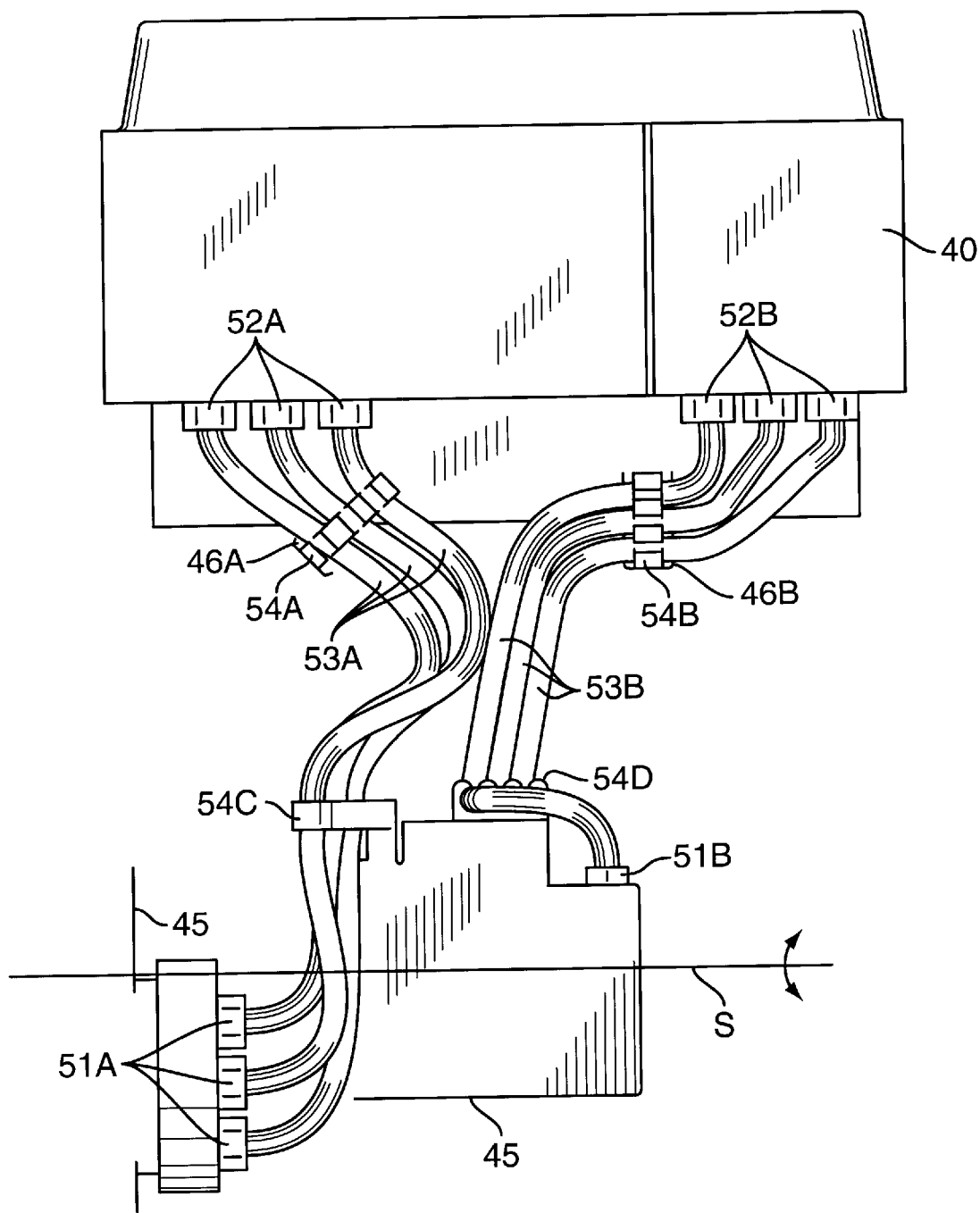
FIG. 3 is front elevation of an inverter housing and transaxle case showing the arrangement of high power cables according to this invention.
Figure 4:
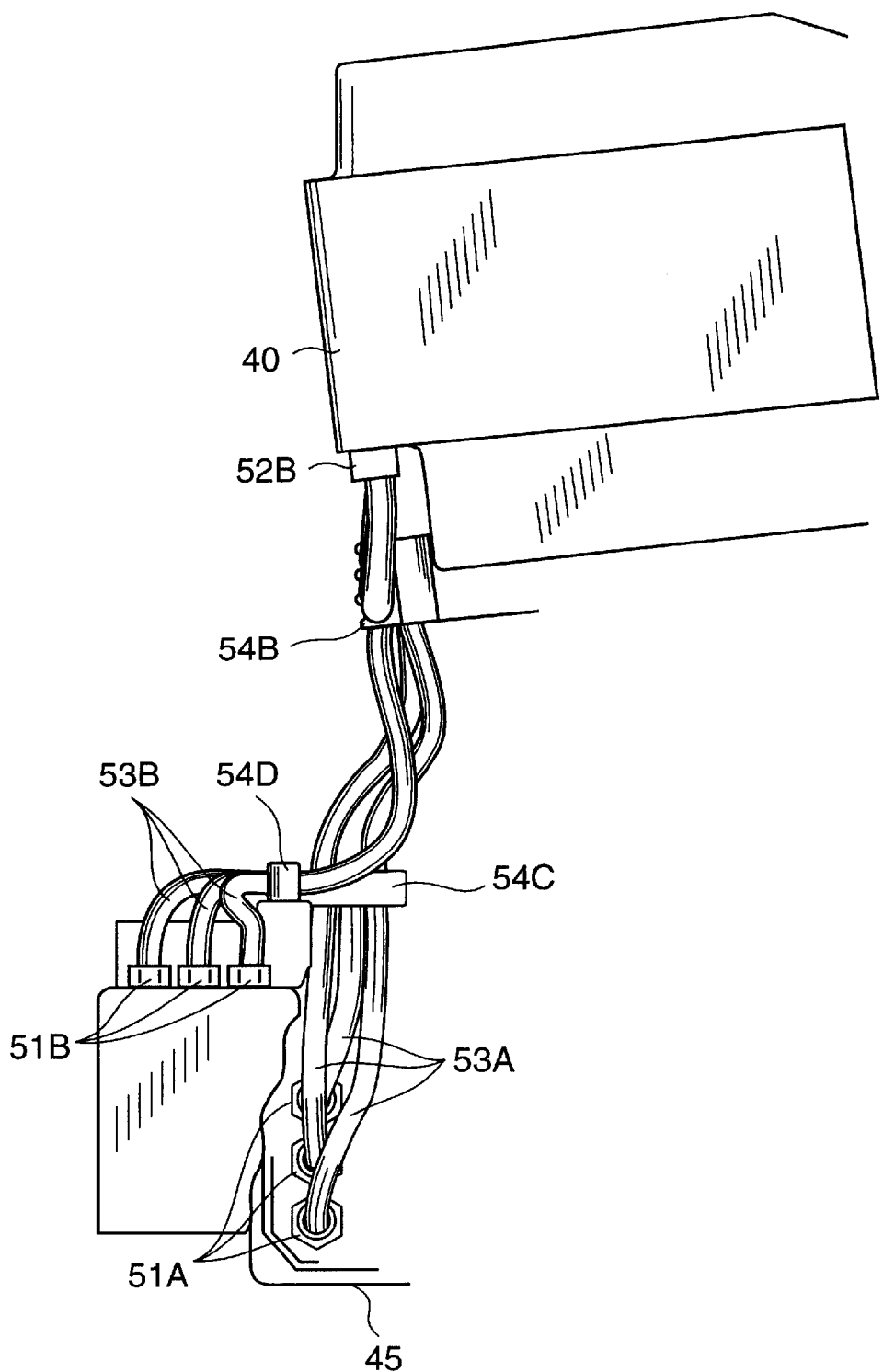
FIG. 4 is a side view of the inverter housing and transaxle case showing the arrangement of the high power cables according to this invention.

Next, referring to FIGS. 3 and 4, three electric terminals 51A and three electric terminals 51B respectively connected to the motors 1 and 4 are provided on the outer surface of the transaxle case 45.

Three electric terminals 52A and three electric terminals 52B are respectively arranged on the base of the inverter housing above the electric terminals 51A and 51B.

The electric terminals 52A and 52B are arranged in a row along the drive shaft S. In such an arrangement, it is easy to lay the high power cable in the narrow space alongside the engine 2.

The electric terminals 51A and 52A are connected by three high power cables 53A. The electric terminals 51B and 52B are connected by three high power cables 53B. The length of the high power cables 53A is longer than the distance between the electric terminals 51A and 52A, and the length of the high power cables 53B is longer than the distance between the energizing terminals 51B and 52B.

To take up the slack in the high power cables 53A, 53B, the high power cables 53A, 53B are curved in the direction of the drive shaft S under the inverter housing 40 as shown in FIG. 3. To arrange the high power cables 53A, 53B in such a curve, holders 54A, 54B for fixing the cables are fixed to the inverter housing 40 via brackets 46A, 46B. The upper parts of the power cables 53A, 53B are respectively fixed to predetermined positions on the base of the inverter housing 40 by the holders 54A, 54B. Also, the lower sides of the high power cables 53A, 53B are fixed to the upper surface of the transaxle case 45 by holders 54C, 54D.

Thus, the high power cables 53A, 53B are forcibly curved by the holders 54A–54D in the direction of the drive shaft S, that is, in the transverse direction of the vehicle. This curvature absorbs the relative displacement of the transaxle case 45 and inverter housing 40 due to vehicle vibration while the vehicle is traveling, and is useful in avoiding too large a bending load acting on the connecting parts between the electric terminals 51A, 51B, 52A, 52B, and high power cables 53A, 53B. Since the upper parts of the high power cables are respectively fixed to the inverter housing 40 by the holders 54A, 54B, and the lower parts thereof are respectively fixed to the transaxle case 45 by the holders 54C, 54D, there is little chance that the high power cables 53A, 53B will come into contact with surrounding equipment due to vibration when the vehicle is running.

Figure 5:
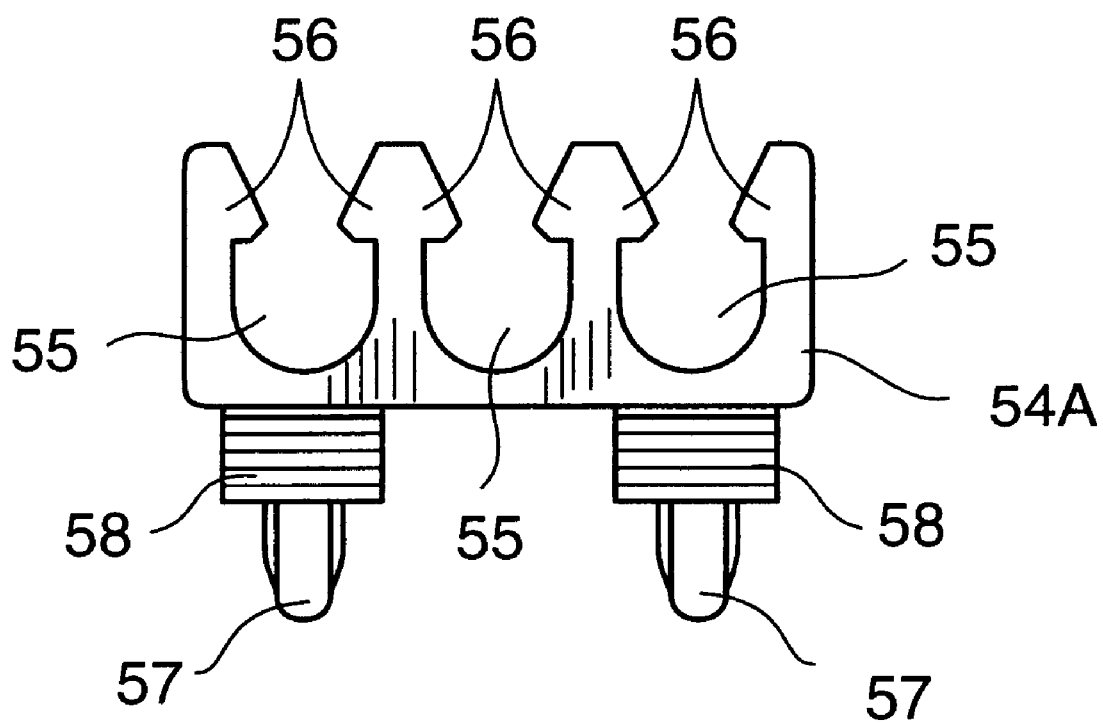
FIG. 5 is a side view of a holder according to this invention viewed from the insertion direction of the high power cables.

Next, the structure of the holders 54A, 54B, 54C and 54D will be described referring to FIGS. 5 and 6.

The holders 54A, 54B, 54C, 54D are formed of a plastic material. Since all these holders have the same structure, the holder 54A will be taken as an example in the following description.

The holder 54A is provided with three openings 55 which have effectively the same internal diameter as that of the outside diameter of the high power cable 53A.

A pair of hooks 56 are respectively provided at the entrance to each of the openings 55. When the high power cable 53A is pressed into the holder 54A, the high power cable 53A is set in this opening 55 while the corresponding pair of hooks 56 are pushed apart, and the cable 53A is thereby held inside the opening 55 by the elastic force of the hooks 56. The holder 54A is fixed to the inverter housing 40 via a flat bracket 46A as shown in FIG. 3. For this purpose, the holder 54A is provided with two projections 57 on its base.

Figure 6:
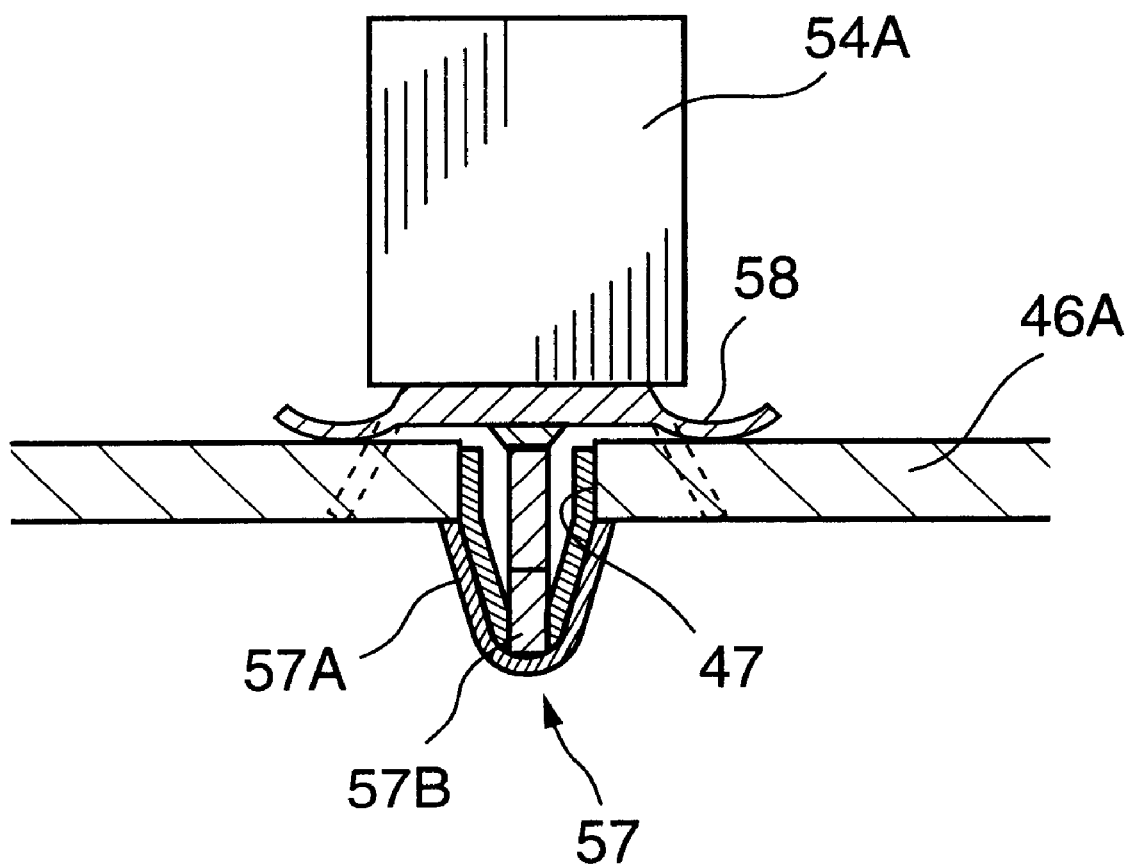
FIG. 6 is another side view of the holder viewed at right-angles to the view of FIG. 5.

As shown in FIG. 6, the projection 57 comprises a flat spring-shaped member 57A whereof the base end widens toward the outside in an inverted V-shape, and a rod 57B which supports the center part of the flat spring-shaped member 57A on the base of the holder 54A.

A pair of flat legs 58 are also provided slanting downwards from both sides of the projection 57 on the base of the holder 54A.

As shown in FIG. 6, two throughholes 47 of rectangular cross-section are formed in the bracket 46A through which the projection 57 can pass. The width of the throughhole 47 is formed slightly less than the width of the base end of the flat spring-shaped member 57A. The projection 57 is pushed into the throughhole 47 by deforming the base end of the member 57A towards the inside.

The flat spring-shaped member 57A which was pushed into the throughhole 47 then returns to its original shape, and the base end projects outside the throughhole 47. Thereafter, the base end of the member 57A comes in contact with the bracket 46A surrounding the throughhole 47 if a pulling force is applied to the member 57A, and provides a resistance to any force tending to pull out the projection 57. Moreover, when the projection 57 is pushed into the throughhole 47, the legs 58 elastically deform outwards from the position of the broken line to the state shown by the solid line in FIG. 6. The holder 54A is thus firmly fixed to the bracket 46A by the base end of the member 57A and the elastically deformed legs 58 which grip the bracket 46A. The holder 54B is fixed to the inverter housing 40 via an identical bracket 46B. Further, the holders 54C, 54D, although not shown, are fixed to the crankcase 45 by an identical structure. Regarding the holders 54A, 54B, the shape of the brackets 46A, 46B and their fixing positions on the inverter housing 40 are preset so that they are fixed with the opening 55 facing the front of the vehicle.

If the vehicle comes in contact with another vehicle or a fixed object, for example, so that a slight collision occurs, and the vehicle suffers an impact which is not severe enough to damage the motors, the inverter housing 40 and transaxle case 45 undergo a large relative displacement due to the difference in the rigidity of the support mechanisms. When the high power cables 53A, 53B are pulled forward strongly by this relative displacement, the hooks 56 of the holders 54A, 54B elastically deform, and the high power cables 53A, 53B respectively separate from the holders 54A, 54B. As a result, since the high power cables 53A, 53B are free to extend further, the high power cables 53A, 53B do not easily become damaged or fall out from the electric terminals. Therefore, electrical connection between the electric terminals 51A and 52A, and electrical connection between the electric terminals 51B and 52B continue to be maintained even after a collision of the vehicle.

To maintain a predetermined curvature of the high power cables 53A, 53B, while suppressing the effect of vibration of the transaxle case 45 and the inverter housing 40, it is preferable to set the restraining force on the high power cables 53A, 53B due to the hooks 56 to be 3–10 times the maximum value of the tractive force, compressive force or bending force on the high power cables 53A, 53B due to the vibration of the engine or transaxle case 45 while the vehicle is traveling.

On the other hand, when there is a large relative displacement between the inverter housing 40 and transaxle case 45, in order that the holders 54A, 54B release the high power cables 53A, 53B, it is preferable to set the restraining force on the high power cables 53A, 53B due to the hooks 56 to lie within the range of $1/10$–$1/3$ of the maximum shearing forces that the high power cables 53A, 53B can withstand.

The material and the size of the hooks 56 are designed to meet the aforesaid requirement.

The contents of Tokugan Hei 10-320158, with a filing date of Nov. 11, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, instead of releasing the high power cables 53A, 53B by the deformation of the hooks 56, it is also possible to design a system wherein the holders 54A, 54B separate from the brackets 46A, 46B when the high power cables 53A, 53B are strongly pulled towards the front by setting the joining force between the projections 57 and brackets 46A, 46B to be weaker.

Further, in this embodiment, the invention was applied to a hybrid vehicle, but there is a possibility that relative displacement of a motor and an electric power supply device will occur in an electric drive vehicle without an engine due to a difference in support rigidity between the motor and electric power supply device. Therefore, this invention is also effective for high power cables which connect the drive device with the power supply device of such an electric drive vehicle.

The embodiments of this invention in which an exclusive property or privilege is claimed are defined as follows:

What is claimed is:

1. An electric drive vehicle, the vehicle comprising:
    a drive device including an electric motor having a drive shaft and a power supply device which supplies current to the electric motor via a high power cable;
    an aligning device including a holder that holds the high power cable in a curved shape along an axial direction of the drive shaft while releasing the high power cable when the high power cable is subject to a predetermined external force acting perpendicular to the drive shaft, wherein the holder is provided with an opening oriented toward the front of the vehicle which receives the high power cable, and a hook comprising an elastic member which prevents detachment of the high power cable when an external force acting on the high power cable is less than a predetermined external force.

2. An aligning device as defined in claim 1, wherein the drive device and power supply device respectively comprise electric terminals which are connected by the high power cable, the electric terminal of the power supply device is disposed above the electric terminal of the drive device, and the holder holds the high power cable in a curved shape between the electric terminal of the power supply device and the electric terminal of the drive device.

3. An aligning device as defined in claim 1, wherein the drive device and power supply device each comprise plural electric terminals connected to plural high power cables, and the electric terminals of the power supply device are disposed in a row in the axial direction of the drive shaft.

4. An aligning device as defined in claim 1, wherein the aligning device further comprises a bracket fixed to the power supply device and the holder is fixed to the bracket via an elastically deforming member.

5. An aligning device as defined in claim 4, wherein the aligning device further comprises another holder that fixes the high power cable to the drive device.

6. An aligning device as defined in claim 1, wherein the electric drive vehicle is a hybrid drive vehicle which runs under a drive force of an engine and a drive force of the electric motor, and the drive device is fixed to the engine.

7. An aligning device as defined in claim 1, wherein the holder holds the high power cable in a plane which is parallel to the axial direction of the drive shaft.

8. An aligning device as defined in claim 7, wherein the plane lies in a vertical space between the drive device and the power supply device.

* * * * *